US010984329B2

(12) United States Patent
Kolavennu et al.

(10) Patent No.: US 10,984,329 B2
(45) Date of Patent: Apr. 20, 2021

(54) VOICE ACTIVATED VIRTUAL ASSISTANT WITH A FUSED RESPONSE

(71) Applicant: Ademco Inc., Golden Valley, MN (US)

(72) Inventors: Soumitri Kolavennu, Blaine, MN (US); Aravind Padmanabhan, Plymouth, MN (US)

(73) Assignee: Ademco Inc., Golden Valley, MN (US)

( * ) Notice: Subject to any disclaimer, the term of this patent is extended or adjusted under 35 U.S.C. 154(b) by 976 days.

(21) Appl. No.: 15/623,219

(22) Filed: Jun. 14, 2017

(65) Prior Publication Data
US 2018/0365567 A1    Dec. 20, 2018

(51) Int. Cl.
| | |
|---|---|
| G06N 5/02 | (2006.01) |
| G06N 5/04 | (2006.01) |
| G06Q 10/10 | (2012.01) |
| G06N 3/00 | (2006.01) |
| G06N 20/00 | (2019.01) |
| G06N 5/00 | (2006.01) |
| G06N 7/00 | (2006.01) |

(52) U.S. Cl.
CPC ............ *G06N 5/022* (2013.01); *G06N 3/006* (2013.01); *G06N 5/02* (2013.01); *G06N 5/025* (2013.01); *G06N 5/04* (2013.01); *G06N 20/00* (2019.01); *G06Q 10/10* (2013.01); *G06N 5/00* (2013.01); *G06N 7/005* (2013.01); *G06Q 10/109* (2013.01)

(58) Field of Classification Search
CPC ........ G06N 5/022; G06N 20/00; G06N 3/006; G06N 5/02; G06N 5/025; G06N 5/04; G06N 5/00; G06N 7/005; G06Q 10/10; G06Q 10/109
See application file for complete search history.

(56) References Cited

U.S. PATENT DOCUMENTS

| | | |
|---|---|---|
| 6,052,666 A | 4/2000 | Diehl et al. |
| 6,408,272 B1 | 6/2002 | White et al. |
| 7,031,438 B1 | 4/2006 | Cheston, III et al. |
| 7,447,635 B1 | 11/2008 | Konopka et al. |
| 7,831,426 B2 | 11/2010 | Bennett |
| 7,933,777 B2 | 4/2011 | Koll |
| 7,957,974 B2 | 6/2011 | Cho et al. |

(Continued)

FOREIGN PATENT DOCUMENTS

| | | |
|---|---|---|
| AU | 2017210578 A1 | 8/2017 |
| EP | 0986808 B1 | 2/2002 |

OTHER PUBLICATIONS

European Search Report for EP Application No. 14165437.6, dated Aug. 7, 2014.

(Continued)

*Primary Examiner* — Daniel C Puentes
(74) *Attorney, Agent, or Firm* — Shumaker & Sieffert, P.A.

(57) ABSTRACT

A voice activated knowledge management system may be used as a virtual assistant. In some cases, a knowledge management system may be configured to receive a voice request from a user, generate and send a knowledge base query to each of the two or more different knowledge base engines, and fuse the resulting responses from the knowledge base engines, resulting in a fused response. The fused response may be provided back to the user as a response to the voice request and/or may be provided as a device command to control a corresponding device.

22 Claims, 8 Drawing Sheets

(56) References Cited

U.S. PATENT DOCUMENTS

| | | |
|---|---|---|
| 8,321,444 B2 | 11/2012 | Mowatt et al. |
| 8,340,975 B1 | 12/2012 | Rosenberger |
| 8,346,794 B2 | 1/2013 | Cheng et al. |
| 8,396,710 B2 | 3/2013 | White et al. |
| 8,666,963 B2 | 3/2014 | Sejnoha et al. |
| 8,818,789 B2 | 8/2014 | Abir |
| 8,831,957 B2 | 9/2014 | Taubman et al. |
| 8,868,428 B2 | 10/2014 | Gruenstein et al. |
| 9,058,390 B2 | 6/2015 | Barve et al. |
| 9,472,205 B2 | 10/2016 | Kolavennu et al. |
| 9,495,962 B2 | 11/2016 | Govrin et al. |
| 9,542,956 B1 | 1/2017 | Nostrant |
| 9,875,741 B2 | 1/2018 | Gelfenbeyn et al. |
| 9,953,088 B2 * | 4/2018 | Gruber ............... G06F 16/9535 |
| 10,241,752 B2 * | 3/2019 | Lemay .................. G06Q 30/02 |
| 2002/0069063 A1 | 6/2002 | Buchner et al. |
| 2003/0093272 A1 | 5/2003 | Soufflet et al. |
| 2003/0187659 A1 | 10/2003 | Cho et al. |
| 2003/0212666 A1 * | 11/2003 | Basu ................... G06F 16/3338 |
| 2004/0193603 A1 | 9/2004 | Ljubicich |
| 2005/0149496 A1 | 7/2005 | Mukherjee et al. |
| 2007/0288129 A1 | 12/2007 | Komer et al. |
| 2008/0147397 A1 | 6/2008 | Konig et al. |
| 2009/0287678 A1 * | 11/2009 | Brown ................. G06F 16/334 |
| 2010/0030734 A1 | 2/2010 | Chunilal |
| 2010/0286985 A1 | 11/2010 | Kennewick et al. |
| 2012/0059658 A1 | 3/2012 | Sejnoha et al. |
| 2012/0232886 A1 | 9/2012 | Capuozzo et al. |
| 2013/0031476 A1 | 1/2013 | Coin et al. |
| 2014/0223465 A1 | 8/2014 | Hatambeiki et al. |
| 2014/0379323 A1 | 12/2014 | Anastasakos et al. |
| 2015/0088518 A1 | 3/2015 | Kim et al. |
| 2015/0277681 A1 | 10/2015 | Isaacson et al. |
| 2015/0348551 A1 | 12/2015 | Gruber et al. |
| 2016/0335264 A1 | 11/2016 | Behal et al. |
| 2017/0024465 A1 | 1/2017 | Yeh et al. |
| 2017/0161268 A1 | 6/2017 | Badaskar |
| 2018/0211666 A1 | 7/2018 | Kolavennu et al. |

OTHER PUBLICATIONS

Dreilinger et al., "Experiences with Selecting Search Engines Using Metasearch," ACM Transactions on Information Systems, vol. 15, No. 3, pp. 195-222, Jul. 1997.

http://federatedsearchblog.com/2009/01/30/steven-bell-on-the-future-of-federated-search/, "Steven Bell on the Future of Federated Search," 3 pages, printed Feb. 7, 2017.

https://en.wikipedia.org/wiki/Federated_search, "Federated Search, From Wikipedia, the Free Encyclopedia," 4 pages, printed Feb. 7, 2017.

https://en.wikipedia.org/wiki/Search_aggregator, "Search Aggregator, From Wikipedia, the Free Encyclopedia," 2 pages, printed Mar. 27, 2017.

* cited by examiner

VOICE ACTIVATED VIRTUAL ASSISTANT WITH A FUSED RESPONSE

BACKGROUND

The present disclosure relates to knowledge management systems, and more particularly, to voice activated knowledge management systems that can be used as a virtual assistant.

SUMMARY

The disclosure relates to knowledge management systems, and more particularly, to voice activated knowledge management systems that can be used as a virtual assistant. In some cases, a knowledge management system may be configured to receive a voice request from a user, generate and send a knowledge base query to each of the two or more different knowledge base engines, and fuse the resulting responses from the knowledge base engines, resulting in a fused response. The fused response may be provided back to the user as a response to the voice request and/or may be provided as a device command to control a device.

In an example of the disclosure, a voice activated knowledge management system may include an input for receiving a text based message from a speech recognition module that converts a spoken request from a user into the text based message, a knowledge base interface for interfacing with two or more different knowledge base engines and an output interface. A controller may be operatively coupled to the knowledge base interface and may be configured to generate and send a knowledge base query via the knowledge base interface to each of the two or more different knowledge base engines. The query may be based at least in part on the text based message received from the speech recognition module. The controller may also be configured to receive a corresponding response from each of the two or more different knowledge base engines via the knowledge base interface. The controller may fuse two or more responses from two or more different knowledge base engines, resulting in a fused response. The fused response may be output via the output interface.

In another example of the disclosure, a voice activated knowledge management system may include an input for receiving a text based message from a speech recognition module that converts a spoken request from a user into the text based message, a knowledge base interface for interfacing with two or more different knowledge base engines and an output interface. A controller may be operatively coupled to the knowledge base interface and may be configured to select less than all of the two or more different knowledge base engines based at least in part on the text based message, and generate and send a knowledge base query that is based at least in part on the text based message to each of the selected knowledge base engines via the knowledge base interface. The controller may also be configured to receive a corresponding response from each of the selected knowledge base engines via the knowledge base interface. The controller may generate an output that is based at least in part on the corresponding responses from each of the selected knowledge base engines, and deliver the output via the output interface.

In another example of the disclosure, a voice activated knowledge management system may include an input for receiving a first text based message from a speech recognition module that converts a spoken request from a user into the first text based message, a knowledge base interface for interfacing with two or more different knowledge base engines and an output interface. A controller may be operatively coupled to the knowledge base interface and may be configured to generate and send a first knowledge base query that is based at least in part on the first text based message to a first knowledge base via the knowledge base interface, and to receive a response from the first knowledge base via the knowledge base interface. The controller may be configured to modify the first text based message to a second text based message based at least in part on the response from the first knowledge base, and to generate and send a second knowledge base query that is based at least in part on the second text based message to a second knowledge base via the knowledge base interface, and to receive a response from the second knowledge base via the knowledge base interface. The controller may be configured to generate an output based at least in part on the response from the second knowledge base, and deliver the output via the output interface.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Figure 1:
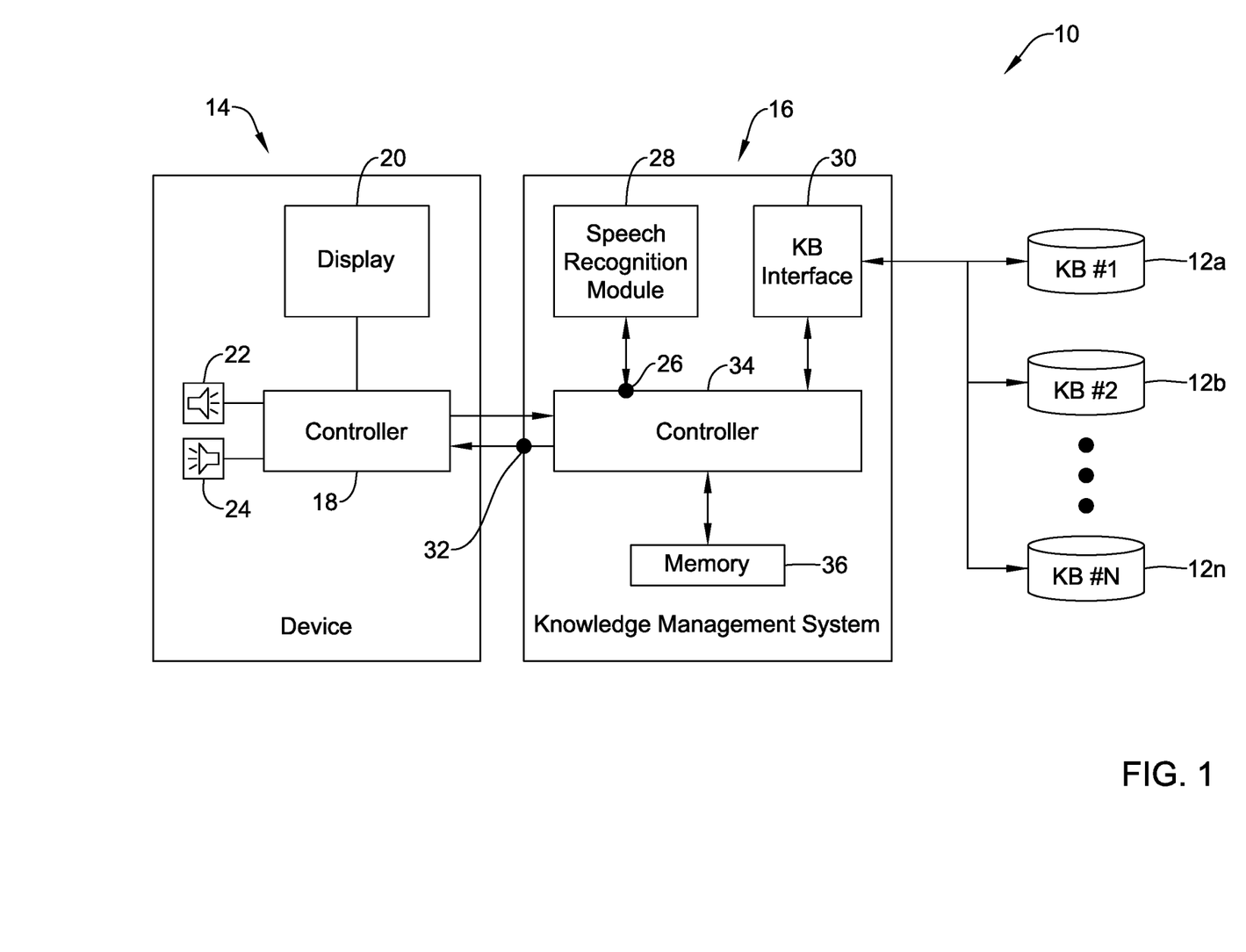
FIG. 1 is a schematic block diagram of an illustrative system by which a user may present queries and obtain results from a plurality of knowledge bases, the system including a knowledge management system in accordance with the disclosure.

FIG. 1 is a schematic block diagram of an illustrative system 10 by which a user may present queries, including verbal queries, and obtain results from one or more of a plurality of knowledge bases 12a, 12b through 12n. The illustrative system includes a device 14 through which a user may ask a question or give a command. The illustrative system also includes a knowledge management system 16 that may, for example, receive a query from the device 14, process the query to prepare a suitable text query that can be searched within an appropriate knowledge base 12a, 12b through 12n, conduct an appropriate search, and then return results to the user via the device 14 or to another device (e.g. a device that is to be controlled). In some cases, as will be discussed, the knowledge management system 16 may utilize two or more different knowledge bases of the knowledge bases 12a, 12b through 12n, receive results from two or more different knowledge bases of the knowledge bases 12a, 12b through 12n, and process the multiple results to provide a fused result to the user via the device 14 or to another device such as a device to be controlled.

It will be appreciated that there are any number of knowledge bases 12a, 12b through 12n that may be searched or otherwise queried. In some cases, the particular knowledge base 12a, 12b through 12n that may be searched or otherwise queried in response to a particular user query may depend upon the particular subject matter or context of the user query. For example, for a general information query, one or more of the knowledge bases 12a, 12b through 12n that may be searched may include the databases generally referenced as one or more of Wikipedia®, Google®, Yahoo®, Linkedin®, Facebook®, Twitter® and others. In some cases, these search engines may be referred to as being knowledge base engines, where the knowledge base engine compiles, organizes and searches the corresponding knowledge base. In some cases, terms such as Google® are relatively ubiquitous, and in some cases may be used to refer to either the knowledge base itself, or the knowledge base engine that drives it. To help determine the context, the user query may be processed using natural language processing techniques including, for example, parts of speech tagging, named entity recognition, sentiment analysis.

The particular databases that are selected for a particular query may depend on the context of the query. For example, in a news related request, one or more of the knowledge bases 12a, 12b through 12n that are searched may include any of a variety of different news sources such as Google®/news, Foxnews®, CNN® and the like. For a finance related request, one or more of the knowledge bases 12a, 12b through 12n that are searched may include any of a variety of different financial news sources such Google®/finance, Yahoo®/finance, the Wall Street Journal®, and the like. For a weather forecast related request, one or more of the knowledge bases 12a, 12b through 12n that are searched may include any of a number of weather information sources such as weather.com, noaa.gov, wunderground.com, and the like. For a weather science related request (e.g. what causes lighting?), one or more of the knowledge bases 12a, 12b through 12n that are searched may include any of a number of general information or science sources such as Wikipedia®, Google, weather.com, noaa.gov, and the like. Requests for travel related information may, for example, be submitted to travel information sources such as but not limited to Expedia®, Travelocity®, Tripadvisor®, and the like. Requests related to playing or purchasing music or other media may be submitted to any of a number of different sources, such as but not limited to, iTunes®, Spotify®, Soundhound®, Amazon® and the like. Requests for biographical information about a musician or band may be submitted to any of a number general information or music sources such as Wikipedia®, Google, Rollingstone®, Famouspeople®, and the like. It will be appreciated that these examples are merely intended to be illustrative, and are not intended to be limiting in any fashion.

In general terms, the device 14 may be configured to accept a query from the user, and to forward the query to the knowledge management system 16. The device 14 may subsequently receive a result from the knowledge management system 16, such as but not limited to, a fused result, and may present the result to the user. In some cases, the device 14 may be considered as including a controller 18 that may be configured to operate the device 14 and a display 20 that is operably coupled with the controller 18 such that the controller 18 is able to display information on the display 20 for the user. The device 14 may include a microphone 22 and a speaker 24 that are both operably coupled to the controller 18. In some cases, the device 14 may receive verbal queries in the form of speech from the user via the microphone 22 and may verbally report results via the speaker 24. In some cases, the device 14 may provide verbal results via the speaker 24 while also providing visual results such as text, images, video clips and the like, via the display 20. In some cases, the result(s) may be submitted as a command to a device, such as device 14 or another device, to change the operation of the commanded device. In some instances, the display 20 may be a touch screen display, and thus may itself be configured to accept inputs from the user, including for example a query from the user.

In some cases, the device 14 may be a commercially available product. For example, the device 14 may be the Amazon Echo® hands free speaker device, which may be operably coupled to the Alexa® Voice Service available from Amazon. The Alexa® Voice Service may be connected to and service the Echo hands free speaker device, and may in turn communicate with the knowledge management system 16. In some cases, some of the functionality of the knowledge management system 16 may reside within the Amazon Echo® hands free speaker device and/or the Alexa® Voice Service. In another example, the device 14 may be the Google Home® hands free speaker device, which may be operably coupled to the Google Home® Voice Service available from Google. The Google Home® Voice Service may be connected to and service the Google Home hands free speaker device, and may in turn communicate with the knowledge management system 16. In some cases, some of the functionality of the knowledge management system 16 may reside within the Google Home® hands free speaker device and/or the Google Home® Voice Service.

In some cases, the device 14 may be built into another device, such as but not limited, to a Honeywell branded thermostat such as under the Honeywell Lyric™ brand. In some cases, the device 14 may itself be split between multiple devices such as a thermostat, a light bulb, a smoke detector and/or any other suitable device or devices. In some cases, the speaker 24 may be included in one device, and the microphone 22 may be included in another device. For example, the microphone 22 may be included in a thermostat, and the speaker may be included in a music player, television or other suitable device. When so provided, the voice command (e.g., sometimes a trigger phrase, such as "Alexa", "Ok. Google", or "Hello Lyric", followed by voice command) may be received at one device (e.g. thermostat), and the response from the web-service may be heard back at a different device (e.g. music player or television). These are just examples.

The knowledge management system 16 may be manifested within a single housing. In some cases, portions of the knowledge management system 16 may be cloud-based. In any event, the knowledge management system 16, which in some cases may be considered as being a voice activated knowledge management system, may include an input 26 for receiving a text based message from a speech recognition module 28. In some cases, the speech recognition module 28 converts a spoken request, received from the device 14, into a text based message. In some cases, the speech recognition module 28 may be configured to listen for a trigger word or phrase, and once the trigger word or phrase is detected, to listen for and receive the spoken request from the user. In some cases, the speech recognition module 28 may use Hidden MarKov Models and/or deep neural network for initial speech recognition. Parts of speech tagging and named entity recognition algorithms may be used on the recognized speech to identify key verbs and key nouns that comprise the spoken request. This is just an example, and it is contemplated that the speech recognition module 28 any suitable speech recognition algorithm.

The illustrative knowledge management system 16 includes a knowledge base interface 30 for interfacing with two or more different knowledge bases 12a, 12b through 12n. An output interface 32 may be configured to output results back to the device 14 or another device. A controller 34 is operatively coupled to the speech recognition module 28 and the knowledge base interface 30, and may be configured to generate and send a knowledge base query via the knowledge base interface 30 to each of the two or more different knowledge bases 12a, 12b through 12c that is based at least in part on the text based message, and to receive a corresponding response from each of the two or more different knowledge bases 12a, 12b through 12n via the knowledge base interface 30.

In some cases, the controller 34 may be configured to select less than all of the two or more different knowledge bases 12a, 12b through 12n and/or knowledge base engines based at least in part on the text based message, and to generate and send a knowledge base query that is based at least in part on the text based message to each of the selected knowledge bases 12a, 12b through 12n or knowledge base engines via the knowledge base interface 30, and receive a corresponding response from each of the selected knowledge bases 12a, 12b through 12n and/or knowledge base engines via the knowledge base interface 30. In some cases, the controller 34 may initially start with the key verbs and/or nouns in the spoken request that are identified by the speech recognition module 28. A related semantic graph aligned to the initial key words may be used to attach additional keywords to the list if desired. The resulting keyword list may be used as input to a Machine Learning algorithm (e.g. neural network, classification and regression tree algorithm and/or random forest to determine a list of knowledge bases 12a, 12b through 12n to which the particular knowledge base query should be sent.

In some cases, the controller 34 may be configured to determine a context based at least in part on the text based message, and generate and send a knowledge base query that is based at least in part on the determined context and the text based message to each of the two or more different knowledge bases 12a, 12b through 12n and/or different knowledge base engines via the knowledge base interface 30. In some instances, the controller 34 may be configured to determine the context by sending the text based message to a context knowledge base, and in response, receiving an indication of the context from the context knowledge base.

In some cases, as will be discussed, the controller 34 may be configured to fuse two or more responses from two or more different knowledge bases 12a, 12b through 12n or knowledge base engines, resulting in a fused response, and may output the fused response via the output interface 32. In some cases, for example, the controller 34 may be configured to fuse two or more responses by ranking the two or more responses and selecting only a best one of the two or more responses. Alternatively, the controller 34 may be configured to fuse two or more responses by combining information from each of two or more responses into a single response, or to sequentially output each of two or more responses, via the output interface 32.

In some cases, a semantic analysis and voting on the confidence of each of the two or more responses from the two or more different knowledge bases 12a, 12b through 12n or knowledge base engines are used. In some cases, such an analysis is used to: (1) rank order the results by confidence and relevance; and/or (2) provide a gap metrics for each knowledge base 12a, 12b through 12n or knowledge base engine compared to the others. When so provided, the rank order and/or gap metrics may provide a further basis for combination of the results for output fusion. An iterative learning algorithm may be used to take the results as an addition to a training set to help increase the accuracy of future queries and selection methods.

In some cases, the knowledge management system 16 may include a memory 36. In some cases, the memory 36 may be configured to store a user profile for the user, or perhaps a plurality of user profiles for a plurality of users, and the controller 34 may, for example, generate the knowledge base query based at least in part on the text based message and the user profile. In some cases, the memory 36 may store query results for subsequent use, particularly if the user or one of the plurality of users frequently asks similar questions or issues similar commands. The memory 36 may store the answer, or perhaps in some cases the memory 36 may store a ready-made query so that the controller 34 can easily send the query to the knowledge bases 12a, 12b through 12n without having to significantly processes the query. In some cases, the controller 34 may use a learning algorithm that is configured to generate improved knowledge base queries with continued use. In some cases, the learning algorithm may be stored in the memory 36.

In some cases, the controller 34 may be configured to select less than all of the two or more different knowledge bases 12a, 12b through 12n and/or the corresponding knowledge base engines based at least in part on the text based message, and generate and send a knowledge base query that is based at least in part on the text based message to each of the selected knowledge bases 12a, 12b through 12n and/or the corresponding knowledge base engines via the knowledge base interface, and receive a corresponding response from each of the selected knowledge bases 12a, 12b through 12n and/or the corresponding knowledge base engines via the knowledge base interface 30.

In some cases, the controller 34 may generate an output that is based at least in part on the corresponding responses from each of the selected knowledge bases 12a, 12b through 12n and/or the corresponding knowledge base engines, and deliver the output via the output interface 32. In some cases, the output may include a fusion of two or more responses from two or more different knowledge bases 12a, 12b through 12n and/or the corresponding knowledge base engines. In some cases, the fusion includes selecting only a best one of the two or more responses, or in some cases combining information from each of two or more responses into a single response. Alternatively, and in some cases, each of two or more responses may be output via the output interface 32.

In some instances, the knowledge management system 16 may receive a first text based message from the speech recognition module 28, which converted a spoken request form the user into the first text based message. The controller 34 may then generate and send a first knowledge base query that is based at least in part on the first text based message to a first knowledge base 12a, 12b through 12n via the knowledge base interface 30, and may then receive a response from the first knowledge base 12a, 12b through 12n via the knowledge base interface 30. In some cases, the controller 34 may then modify the first text based message to a second text based message based at least in part on the response from the first knowledge base 12a, 12b through 12n, and then generate and send a second knowledge base query that is based at least in part on the second text based message to a second knowledge base 12a, 12b through 12n via the knowledge base interface 30, and to receive a response from the second knowledge base via the knowledge base interface 30. In some cases, the controller 34 may be configured to generate an output based at least in part on the response from the second knowledge base 12a, 12b through 12n, and deliver the output via the output interface 32.

In some cases, for example, the controller 34 may be configured to generate the output based at least in part on the responses from the first knowledge base 12a, 12b, through 12n and the second knowledge base 12a, 12b through 12n. In some cases, the controller 34 may be configured to fuse the responses from the first knowledge base 12a, 12b through 12n and the second knowledge base 12a, 12b through 12n into a consolidated response to the first knowledge base query.

Rather than outputting a response from the second knowledge base 12a, 12b through 12n, the controller 34 may be configured to modify the second text based message to a third text based message based at least in part on the response from the second knowledge base 12a, 12b through 12n, and then generate and send a third knowledge base query that is based at least in part on the third text based message to a third knowledge base 12a, 12b through 12n via the knowledge base interface 30. The controller 34 may continue with this loop until the received response is determined to have a confidence level that is above a confidence level threshold. The controller 34 may generate an output and deliver the output via the output interface 32. The confidence level may be indicated when a difference in information between the received response and the previous response(s) is less than a threshold value. In some cases, the user may provide feedback at one or more stages of the loop to indicate of the returned response is what is desired. This feedback may be used by the controller 34 to terminate the loop and/or help learn to processes future queries more efficiently and accurately.

Figure 2:
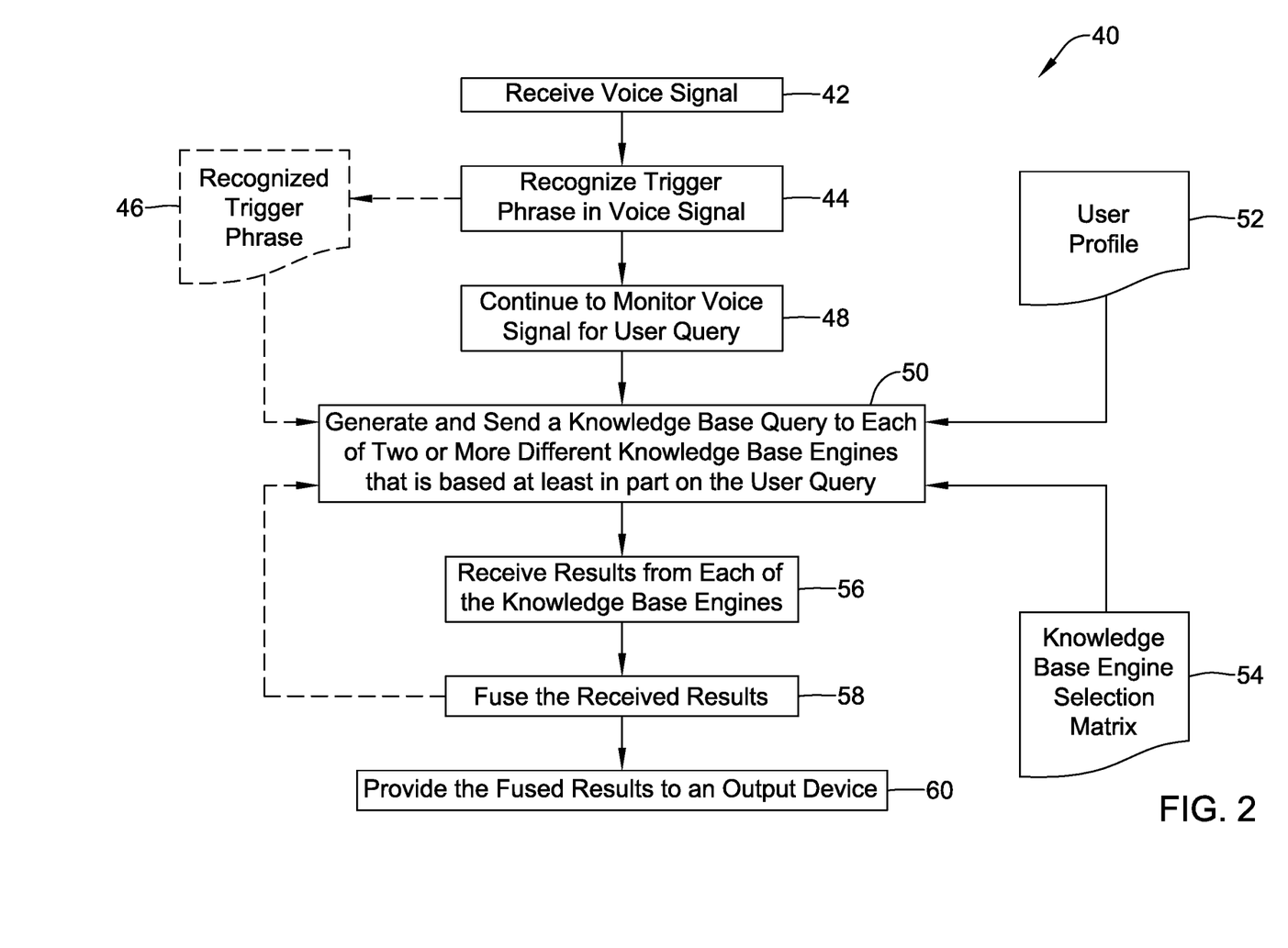
FIG. 2 is a flow diagram showing illustrative steps by which a knowledge management system such as the knowledge management system of FIG. 1 may receive, process and answer a query from a user in accordance with the disclosure.

FIG. 2 is a flow diagram showing an illustrative method 40 that may be carried out via the system 10, including the device 14 and the knowledge management system 16. At block 42, a voice signal is received, such as by the microphone 22 (FIG. 1) and is forwarded to the speech recognition module 28 so that the voice signal may be processed. As seen at block 44, a determination is made as to whether the voice signal includes a recognized trigger phrase. It will be appreciated that a variety of background noises, including individuals talking, the soundtrack on a television, a radio station and the like, may be picked up by the microphone 22. If a recognized trigger phrase is heard, the knowledge management system 16 is configured to proceed with processing a query, and control passes to block 46, where the knowledge management system 16 continues to monitor the voice signal for a user query following the recognized trigger phrase.

Figure 6:
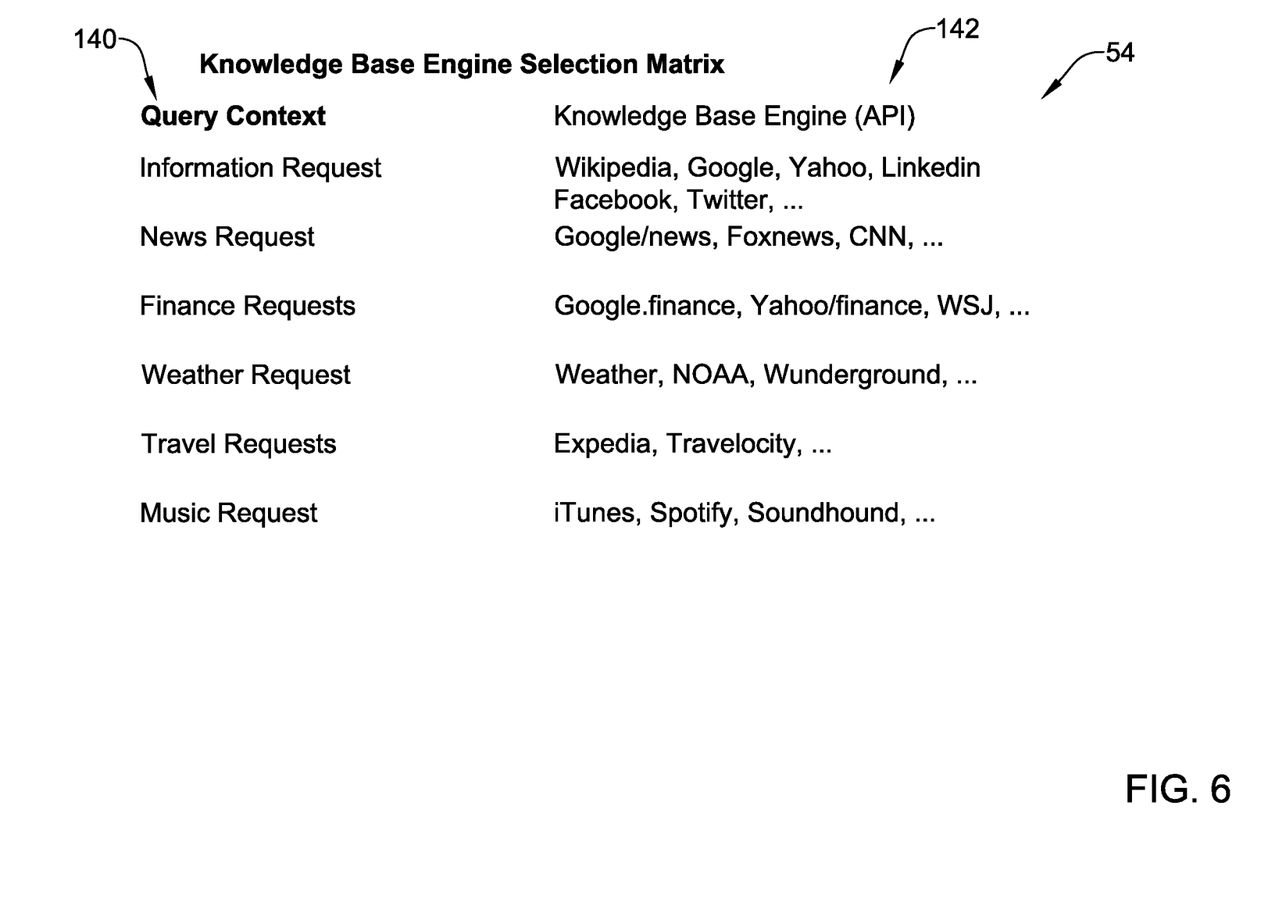
FIG. 6 is a schematic diagram of an illustrative knowledge base engine selection matrix in accordance with the disclosure.

If and when a user query is detected, control passes to block 50, where the controller 34 generates and sends a knowledge base query to each of two or more different knowledge bases 12a, 12b through 12n. The knowledge base query may, for example, be based at least in part upon the user query. In some cases, the knowledge base query may also be based at least in part upon information stored within a user profile 52, which as noted above may be stored within the memory 36. In some cases, the controller 34 may rely at least in part upon a knowledge base engine selection matrix 54. The knowledge base engine selection matrix 54 may assist the controller 34 in determining the best knowledge bases 12a, 12b through 12n and/or corresponding knowledge base engines to send a particular user query. In some cases, the knowledge base engine selection matrix 54 may include categories of query contexts, and lists of potential knowledge bases to search for each category. The knowledge base engine selection matrix 54 may also identify the proper query format for the various knowledge base engines. Each knowledge base engine may, for example, have an Application Program Interface (API) that expects the knowledge base queries received by the knowledge base engine to have a certain format. The knowledge base interface 30 may properly format each knowledge base query to comply with the corresponding formatting requirements. As will be discussed subsequently, FIG. 6 provides a simplified example of the knowledge base engine selection matrix 54.

As seen at block 56, the controller 34 may receive the results from each knowledge bases 12*a*, 12*b* through 12*n* and/or corresponding knowledge base engines and may fuse the received results, as noted at block 58. In some cases, the controller 34 may then provide the fused results to an output device, as indicated at block 60. In some instances, the controller 34 may instead use the fused results to update the knowledge base query, and the control may revert to block 50.

Figure 3:
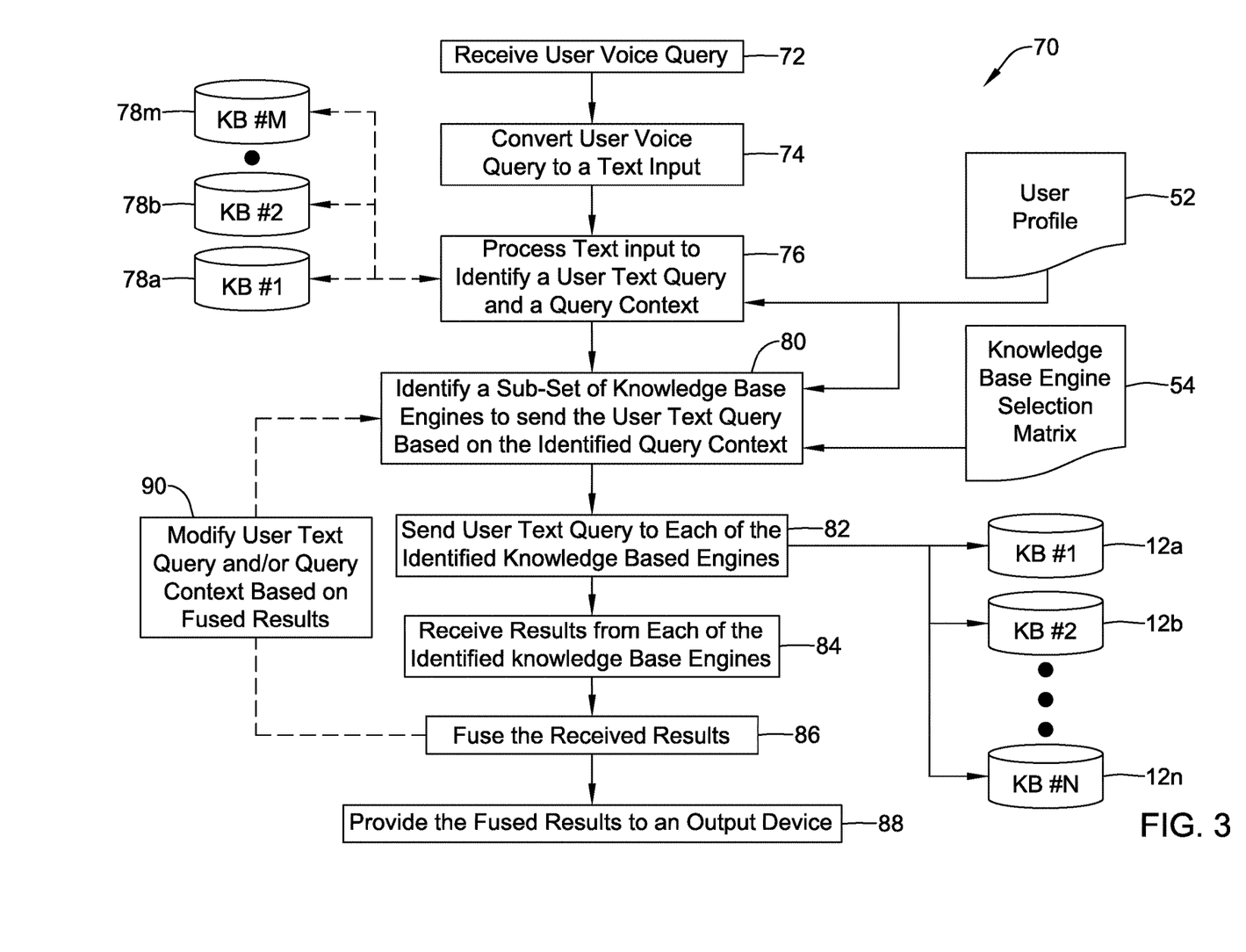
FIG. 3 is a flow diagram showing illustrative steps by which a knowledge management system such as the knowledge management system of FIG. 1 may receive, process and answer a query from a user in accordance with the disclosure.

FIG. 3 is a flow diagram showing an illustrative method 70 that may be carried out via the system 10, including the device 14 and the knowledge management system 16. At block 72, a user voice query is received, and is converted into a text input as seen at block 74. The controller 34 may then process the text input to identify at least one of a user text query and a query context, as indicated at block 76. In some cases, processing the text input to identify a user text query and/or a query context may include sending at least a portion of the text input to one or more knowledge base engines 78*a*, 78*b* through 78*m* so that one or more of the knowledge base engines 78*a*, 78*b* through 78*m* may help process the text input and identify an appropriate query context. It is contemplated that the one or all of the knowledge base engines 78*a*, 78*b* through 78*m* may be the same or different from the knowledge bases 12*a*, 12*b* through 12*n*. In some cases, the controller 34 may also rely at least in part upon information within the user profile 52.

In one particular example, if the text input is "What will the temperature be tomorrow here"? The user profile 52 may be accessed to identify the zip code wherein the user lives. The controller 34 may submit the text input to one or more of the knowledge base engines 78*a*, 78*b* through 78*m*, and based on the results, identify the query context as "Weather Request". The controller 34 may also identify the date for tomorrow via one or more of the knowledge base engines 78*a*, 78*b* through 78*m*. The controller 34 may then assembly the query "What will be the high and low temperature on May 10, 2017 in Minneapolis, Minnesota?".

In some cases, and as indicated for example at block 80, the controller 34 and/or the knowledge base interface 30 may identify a subset of knowledge base engines 78*a*, 78*b* through 78*n* to send the user text query to. In some cases, identifying the subset may involve use of a knowledge base engine selection matrix 54. In some cases, the query context may be used to identify the subset of knowledge base engines 78*a*, 78*b* through 78*n*. The results from each of the identified knowledge base engines 78*a*, 78*b* through 78*n* may be received, as indicated at block 84, and the results may be fused, at indicated at block 86. In some cases, control passes to block 88 and the fused results may be output to the user and/or as a command to a device. In some cases, such as when the returned results are inconsistent with each other or otherwise are deemed to not meet a threshold confidence level, control may be passed back to block 90, where the controller 34 may for example modify the user text query and/or the query context based upon the fused results.

In some cases, the returned results from each of the identified knowledge base engines 78*a*, 78*b* through 78*n* may be processed to identify a further user text query (e.g. block 76) that could produce relevant results and/or identify one or more other knowledge base engines 78*a*, 78*b* through 78*n* to submit the query (e.g. cascaded queries). The further user query, when identified, may be submitted to one or more knowledge base engines 78*a*, 78*b* through 78*n*. Likewise, when one or more other knowledge base engines 78*a*, 78*b* through 78*n* are identified, the user query (e.g. original user query and/or newly identified user query) may be submitted to the newly identified one or more other knowledge base engines 78*a*, 78*b* through 78*n*. In some cases, the returned results from each of the identified knowledge base engines 78*a*, 78*b* through 78*n* are processed only when the results are deemed to be inconsistent with each other and/or are otherwise deemed to not meet a threshold confidence level. In other some cases, the returned results from each of the identified knowledge base engines 78*a*, 78*b* through 78*n* may be processed even when the results are deemed to be consistent with each other and/or are otherwise deemed to meet a threshold confidence level.

Figure 4:
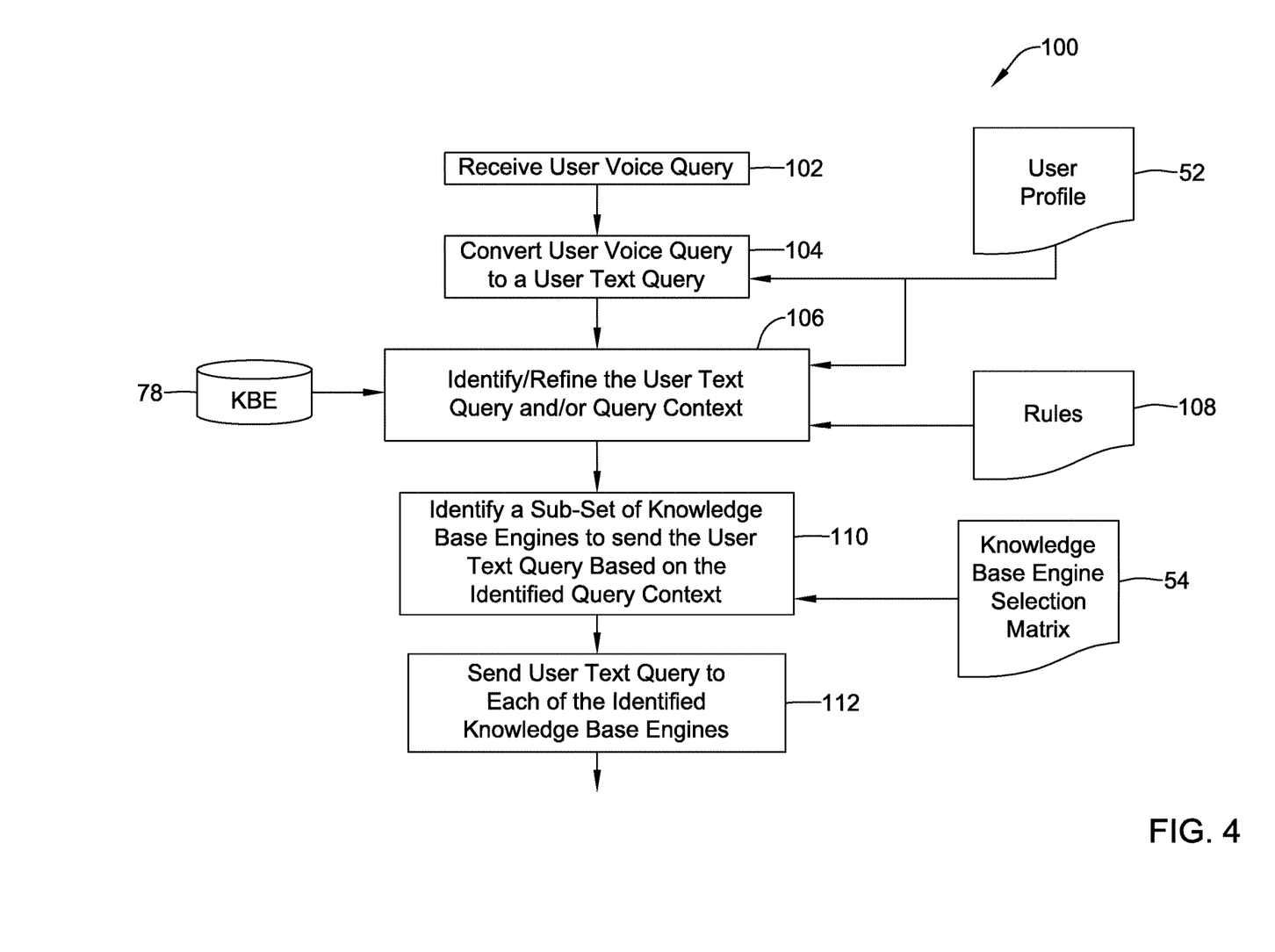
FIG. 4 is a flow diagram showing illustrative steps by which a knowledge management system such as the knowledge management system of FIG. 1 may receive and interpret a query from a user in accordance with the disclosure.

FIG. 4 is a flow diagram showing an illustrative method 100 that may be carried out via the system 10, including the device 14 and the knowledge management system 16. At block 102, a user voice query is received, and is converted into a user text query at shown at block 104. In some cases, information from the user profile 52 may be used by the controller 34 and/or the speech recognition module 28 in converting the user voice query into a user text query. Control passes to block 106, where the controller 34 identifies and/or refines the user text query and/or the query context. In some cases, the controller 34 may solicit information and or advice from a knowledge base engine 78, which may be a single knowledge base engine 78 or one of a plurality of knowledge base engines such as the knowledge base engines 78*a*, 78*b* through 78*m*. In some cases, the controller 34 may also rely at least in part upon a set of rules 108, and may use Machine Learning (ML) and/or Artificial Intelligence (AI) to increase the quality of the user text query over time. Such techniques may include the use of classification and regression trees, random forests, Bayesian belief networks, as well as iterative learning and/or reinforcement learning. These are just examples.

As seen at block 110, the controller 34 and/or knowledge base interface 30 may identify a subset of knowledge base engines to send the user text query to, based at least in part, on the identified query context. In some cases, the controller 34 may consult the knowledge base engine selection matrix 54. The user text query may then be sent to each of the identified knowledge base engines, as seen at block 112. In some cases, the knowledge base engine selection matrix 54 may identify the proper query format for the various knowledge base engines. Each knowledge base engine may, for example, have an Application Program Interface (API) that expects the knowledge base queries received by the knowledge base engine to have a certain format. The knowledge base interface 30 may format the user text query into a format that is compatible with each of the selected knowledge base engines.

Figure 5:
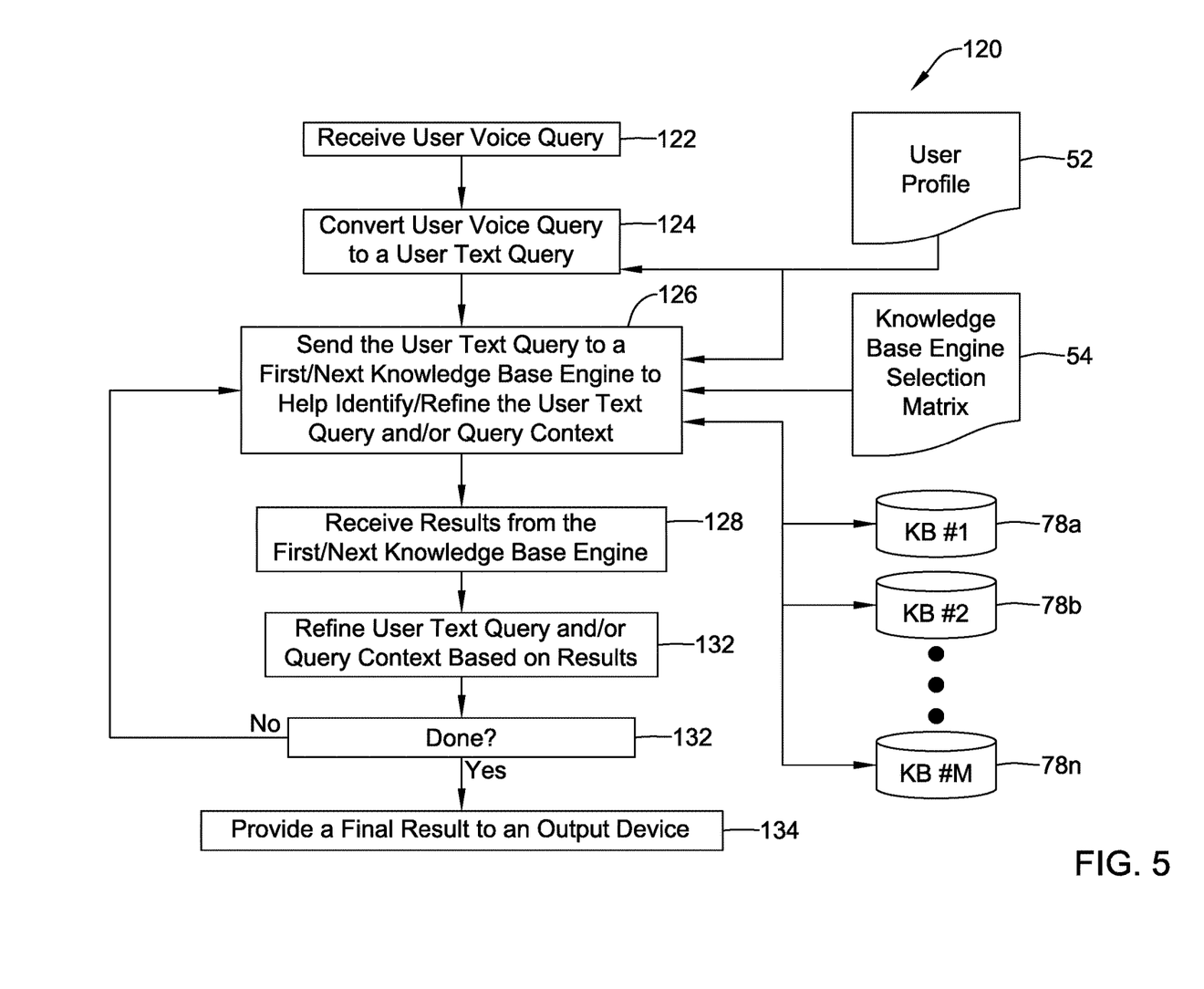
FIG. 5 is a flow diagram showing illustrative steps by which a knowledge management system such as the knowledge management system of FIG. 1 may receive, process and answer a query from a user in accordance with the disclosure.

FIG. 5 is a flow diagram showing an illustrative method 120 that may be carried out via the system 10, including the device 14 and the knowledge management system 16. At block 122, a user voice query is received, and is converted into a user text query at shown at block 124. In some cases, information from the user profile 52 may be used by the controller 34 and/or the speech recognition module 28 in converting the user voice query into a user text query. At block 126, the user text query may be sent via the controller 34 to a first or next knowledge base engine in order to have the knowledge base engine assist in identifying and/or refining the user text query and/or the query context. Control passes to block 128, where results are received from the first/next knowledge base engine. At block 130, the controller 34 may refine the user text query and/or the query context using the results from the first/next knowledge base engine. At block 134, the controller 34 determines if the results justify stopping. If so, control passes to block 134 and the final results are outputted. Otherwise, control reverts to block 126, and the query and/or query context are refined.

FIG. 6 shows a simplified knowledge base engine selection matrix 54. In the illustrated example, the knowledge base engine selection matrix 54 includes a set of query contexts 140, and for each of the query context 140, a list of corresponding knowledge base engines 142 that may be suitable for that particular query context 140. For example, if the query context 140 is a general information request, the knowledge base engine selection matrix 54 may suggest one or more knowledge base engines such as but not limited to Wikipedia®, Google® Yahoo®, Linkedin®, Facebook® and Twitter®. These are just examples. The knowledge base engine selection matrix 54 may include much more information. For example, the knowledge base engine selection matrix 54 may identify the proper query format for the various identified knowledge base engines. Each knowledge base engine may, for example, have an Application Program Interface (API) that expects the knowledge base queries received by the corresponding knowledge base engine to have a certain format. The knowledge base interface 30 consult the knowledge base engine selection matrix 54 to properly format each knowledge base query so as to comply with the formatting requirements.

Figure 7:
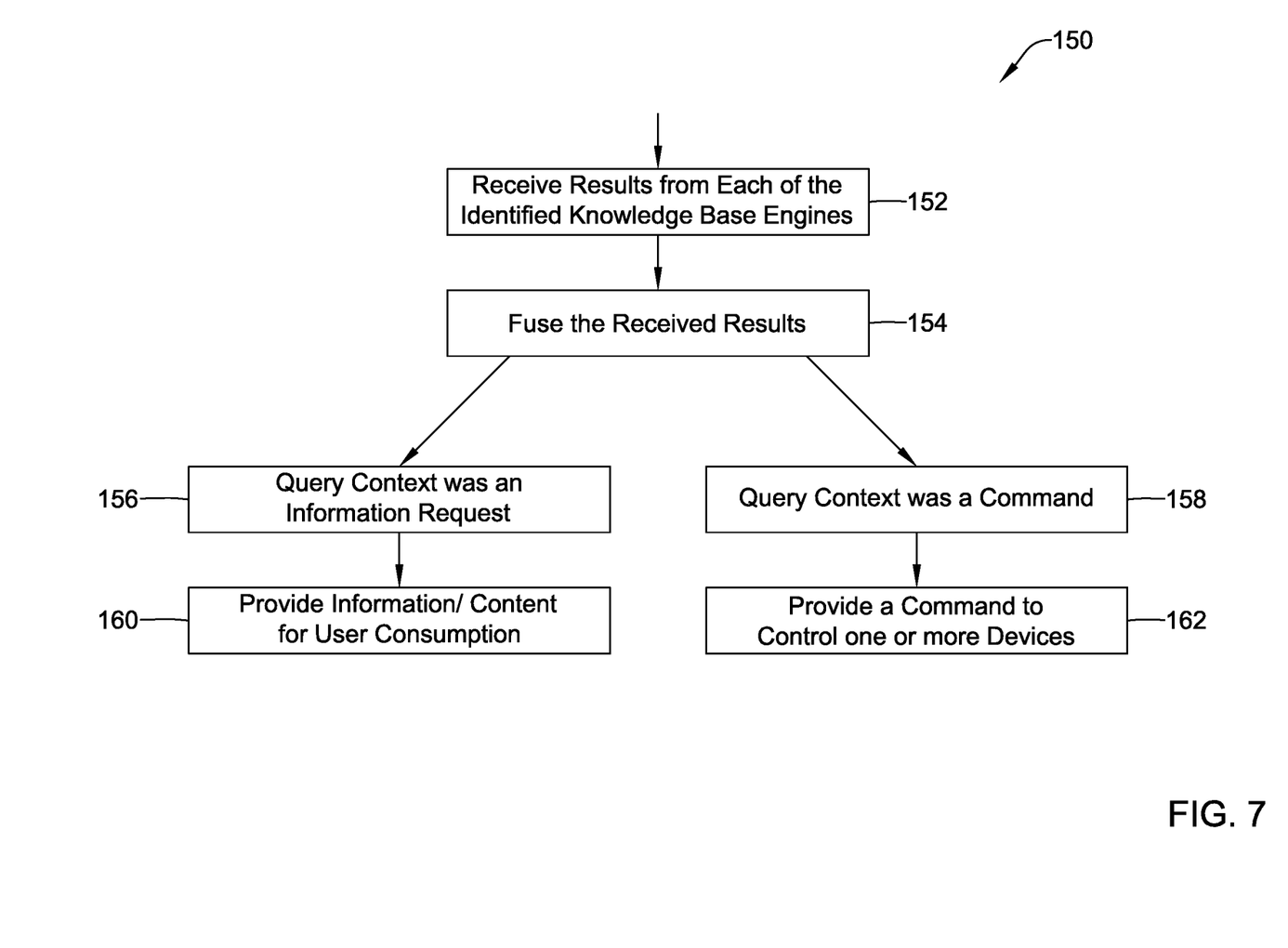
FIG. 7 is a flow diagram showing illustrative steps by which a knowledge management system such as the knowledge management system of FIG. 1 may output the fused results in accordance with the disclosure.

FIG. 7 is a flow diagram showing an illustrative method 150 that may be carried out via the system 10, including the device 14 and the knowledge management system 16, involving how results are outputted. At block 152, the controller 34 may receive results from each of the identified knowledge base engines. Control passes to block 154, where the controller 34 fuses the received results. If the previously determined query context was an information request, as indicated at block 156, control passes to block 160 where the controller 34 may provide information and/or content for user consumption. If the previously determined query context was, for example a command as indicated at block 158, control passes to block 162 where the controller 34 provides a command to control one or more devices. In some cases, the command may be HVAC-related, but other commands relating to home comfort or home security are contemplated, as well as other commands for other devices.

Figure 8:
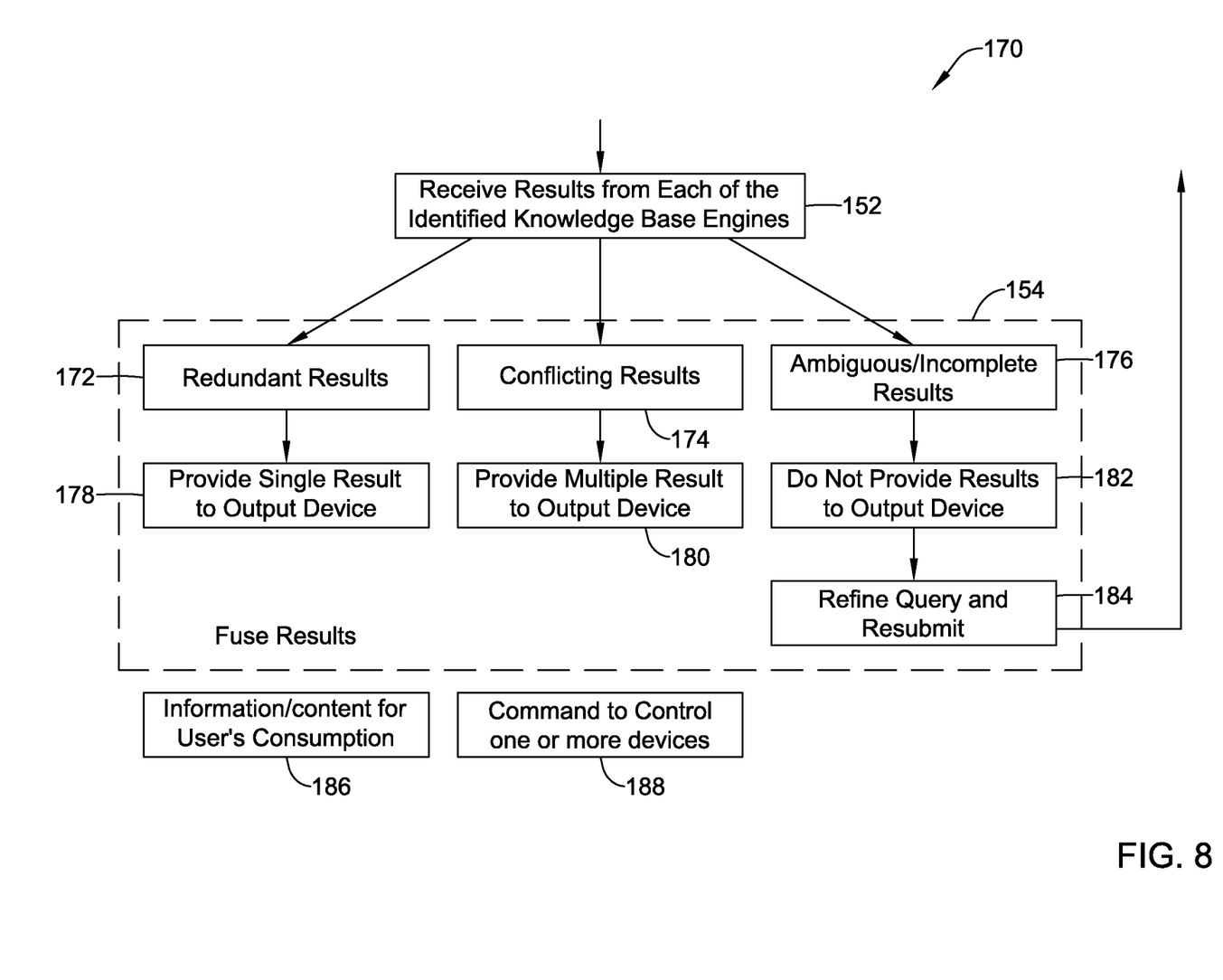
FIG. 8 is a flow diagram showing illustrative steps by which a knowledge management system such as the knowledge management system of FIG. 1 may fuse results in accordance with the disclosure.

FIG. 8 is a flow diagram showing an illustrative method 170 that may be carried out via the system 10, including the device 14 and the knowledge management system 16, involving how results are outputted. At block 152, the controller 34 may receive results from each of the identified knowledge base engines. Control passes to block 154, where the controller 34 fuses the received results. It will be appreciated that when attempting to fuse results, in some cases the multiple results may be redundant, as noted at block 172; or conflicting, as noted at block 174; or even ambiguous and/or incomplete, as indicated at block 176. The controller 34 may determine how best to proceed. For example, in the case of redundant results, the controller 34 may provide a single result to an output device, as seen at block 178. In the case of conflicting results, the controller 34 may output the multiple results, so that the user may determine how to interpret the conflicting results. In the case of ambiguous and/or incomplete results, the controller 34 may choose to not output any results (block 182), but may instead decide to refine and resubmit the query, as noted at block 184. It will be appreciated that, depending on the nature of the query, that this may become an iterative process. The controller 34 may ultimately provide information and/or content for the user's consumption, as noted at block 186, and/or output a command to control one or more devices, as noted at block 188.

In some cases, the results from each of the identified knowledge base engines may be processed to identify a further user text query that could produce relevant results and/or identify one or more other knowledge base engines to submit the query. The further user query, when identified, may be submitted to one or more knowledge base engines (block 184). Likewise, when one or more other knowledge base engines are identified, the user query (e.g. original user query and/or newly identified user query) may be submitted to the newly identified one or more other knowledge base engines. In some cases, the returned results from each of the identified knowledge base engines are processed only when the results are deemed to be ambiguous/inconsistent with each other and/or are otherwise deemed to not meet a threshold confidence level. In other some cases, the returned results from each of the identified knowledge base engines may be processed even when the results are deemed to be consistent with each other and/or are otherwise deemed to meet a threshold confidence level.

Use Case #1: Query Weather Forecast
1. System Converts the User Query "What is the weather forecast for tomorrow?" to text.
2. System determines a knowledge base query of "Weather forecast for Apr. 20, 2017 in Minneapolis, Minnesota", where the location is pulled from the user's profile, and the query context may be "Weather Request".
3. System consults the knowledge base engine selection matrix 54 and identifies knowledge base engines API's of weather.com, noaa.com and wunderground.com.
4. System sends the knowledge base query and query context to each of the knowledge base engines, each formatted for the identified knowledge base engine's API.
5. System received the results from the knowledge base engines.
6. System fuses the received results and presents the results to the user: "Tomorrow will be cloudy in the morning but clear in the afternoon with a high of 72 degrees".

Use Case #2: Where can I Buy a New Air Filter for My Furnace?
1. System Converts User Query "Where can I buy a new air filter for my furnace?" to text.
2. System determines query context of "Air Filter" and "purchase".
3. System consults the user profile to identify if the user has an account on the Honeywell Cloud Service, and if so queries the knowledge base of Honeywell Cloud Service to identify the user's furnace type and location.
4. System consults the knowledge base engine selection matrix 54 and identifies the knowledge base of amazon, google shopping, Lowes, and Home Depot to extract the current availability and price for the type of filter for purchase.

5. System queries the user profile to checks if the user has an account registered with amazon, google shopping, Lowes, or Home Depot or other online retailer.
6. System fuses information to provide the type of furnace filter needed, and the prices at various retail stores.
7. System prompts the user if user wants to purchase with his online retailer account and does so based on the user response.

Use Case 3: Temperature Setback Command
1. System Converts to User Query "Set back my thermostat" to text.
2. System determines query context of "Command" and "Temperature Setback".
3. System consults the user profile to identify if the user has an account on the Honeywell Cloud Service, and if so:
4. System consults the knowledge base engine selection matrix 54 and identifies the knowledge bases of Honeywell Cloud, weather service, connected calendar service, and traffic service.
5. System determines the weather forecast from the weather service to determine the temperature and humidity profile for the day, and calculates the best setback temperature based on the weather data.
6. System queries the calendar and traffic knowledge bases to determine the user's schedule and traffic patterns to determine an expected return time of the user, and sets the temperature setback time to that time.
7. System sends a command to the Honeywell Cloud Service to schedule the thermostat to those temperatures.

Use Case 4: "Set My Cabin to 72 degrees"
1. System Converts to User Query "Set My Cabin to 72 degrees" to text.
2. System determines query context of "Command" and "Set Temperature".
3. System consults the knowledge base engine selection matrix 54 and identifies the knowledge base of Honeywell Cloud.
4. System consults the user profile to identify if the user has an account on the Honeywell Cloud Service, and if so:
5. System sends a command to the Honeywell Cloud Service to change the thermostat temperature to 72 degrees.

Use Case 5: What is My Calendar Today?.
1. System Converts to User Query "What is on my calendar today" to text.
2. System determines query context of "Calendar".
3. System consults the user profile to identify one or more calendar knowledge bases to which the user subscribes.
4. System queries all identified calendar knowledge bases subscribed to by the user.
5. System fuses the results by generating a list of all calendar events.
6. System outputs the fused results to the user.

Use Case 6: What is the Value of Pi?
1. System Converts to user query "What is the Value of Pi" to text.
2. System determines a query context of "Mathematical".
3. System consults the knowledge base engine selection matrix 54 and identifies knowledge bases "Wikipedia", "Wolfram alpha" etc.
4. System sends knowledge base query to the identified knowledge bases "Wikipedia", "Wolfram alpha" etc.
5. The system receives from some of the knowledge bases the definition of pi—"It is the ratio of circumference and diameter of a circle" and others the numerical value "3.141592 . . . ."
6. System provide a fused response of "Pi is defined as the ratio of circumference and diameter of a circle and has the numerical value 3.141592 . . . ."

Use Case 7: "are My Basement Lights Switched Off?"
1. System convers the user query "Are my basement lights switched off?" to text.
3. System determines that the query needs to be sent to only one knowledge engine (e.g. Lutron or other light control knowledge base).
4. System sends the knowledge base query to that knowledge engine Use Case 8: "Reorder Tide Pods"
1. System converts user query "Reorder tide pods" to text.
2. System determines that the query needs to be sent to one knowledge engine (e.g. Amazon engine for purchases).
3. System sends a knowledge base query to that knowledge engine.
4. System provides results from that query.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A voice activated knowledge management system, comprising:
    a speech recognition module configured to convert a spoken request from a user into a text based message;
    a knowledge base interface configured to interface with two or more different knowledge base engines;
    an output interface; and
    a controller operatively coupled to the speech recognition module and the knowledge base interface, the controller configured to:
        generate one or more knowledge base queries based at least in part on the text based message,
        send the one or more knowledge base queries via the knowledge base interface to the two or more different knowledge base engines, and
        receive a first response from a first of the two or more different knowledge base engines and a second response from a second of the two or more different knowledge base engines,
        modify, without user intervention, at least a portion of the text based message based at least in part on one of the first response or the second response to generate a modified text based message,
        generate an updated knowledge base query based at least in part on the modified text based message,
        send the updated knowledge base query via the knowledge base interface to the first knowledge base engine,
        in response to sending the updated knowledge base query, receive a third response from the first knowledge base engine, and
        fuse the second response and the third response to result in a fused response, and
        output the fused response at the output interface.

2. The voice activated knowledge management system of claim 1, wherein the speech recognition module is further configured to:

listen for a trigger word or phrase; and
in response to detecting the trigger word or phrase, listen for and receive the spoken request from the user.

3. The voice activated knowledge management system of claim 1, wherein the controller is further configured to fuse the second response and the third response by ranking the second response and the third response and selecting a best response from the second response and the third response.

4. The voice activated knowledge management system of claim 1, wherein the controller is further configured to fuse the second response and the third response by combining information from each of the second response and the third response into a single response.

5. The voice activated knowledge management system of claim 1, wherein the controller is further configured to fuse the second response and the third response by sequentially outputting each of the second response and the third response via the output interface.

6. The voice activated knowledge management system of claim 1, wherein the controller is further configured to:
select fewer than all of the two or more different knowledge base engines based at least in part on the text based message;
send the one or more knowledge base queries to each of the selected knowledge base engines via the knowledge base interface; and
receive a corresponding response from each of the selected knowledge base engines via the knowledge base interface.

7. The voice activated knowledge management system of claim 1, further comprising a memory for storing a user profile for the user, wherein the controller is configured to generate the one or more knowledge base queries based at least in part on the text based message and the user profile.

8. The voice activated knowledge management system of claim 1, wherein the controller is further configured to:
determine a context based at least in part on the text based message; and
generate the one or more knowledge base queries based at least in part on the context and the text based message.

9. The voice activated knowledge management system of claim 8, wherein the controller is further configured to determine the context by sending the text based message to a context knowledge base and in response, receive an indication of the context from the context knowledge base.

10. The voice activated knowledge management system of claim 1, wherein the controller is configured to use a learning algorithm to generate improved knowledge base queries with continued use of the voice activated knowledge management system.

11. The voice activated knowledge management system of claim 1, wherein the controller is further configured to output the fused response to a user interface via the output interface.

12. The voice activated knowledge management system of claim 1, wherein the fused response that is output via the output interface comprises a device command for controlling a building control device.

13. The voice activated knowledge management system of claim 1, wherein the text based message comprises a command for a device.

14. A voice activated knowledge management system, comprising:
a speech recognition module configured to convert a spoken request from a user into a first text based message;
a knowledge base interface for interfacing with two or more different knowledge base engines;
an output interface;
a controller operatively coupled to the speech recognition module and the knowledge base interface, the controller is configured to:
generate and send a first knowledge base query that is based at least in part on the first text based message to a first knowledge base via the knowledge base interface;
receive a response from the first knowledge base via the knowledge base interface;
modify, without user intervention, the first text based message to a second text based message based at least in part on the response from the first knowledge base;
generate and send a second knowledge base query that is based at least in part on the second text based message to a second knowledge base via the knowledge base interface;
in response to sending the second knowledgebase query to the second knowledge base, receive a response from the second knowledge base via the knowledge base interface;
generate an output based at least in part on the response from the second knowledge base; and
deliver the output via the output interface.

15. The voice activated knowledge management system of claim 14, wherein the controller is further configured to generate the output based at least in part on the responses from the first knowledge base and the second knowledge base.

16. The voice activated knowledge management system of claim 15, wherein the controller is further configured to fuse the responses from the first knowledge base and the second knowledge base into a consolidated response to the first knowledge base query.

17. A method comprising:
converting, by a computing device, a spoken request from a user into a text based message;
generating, by the computing device, one or more knowledge base queries based at least in part on the text based message;
sending, by the computing device, the one or more knowledge base queries to two or more different knowledge base engines;
receiving, by the computing device, a first response from a first of the two or more different knowledge base engines and a second response from a second of the two or more different knowledge base engines;
modify, by the computing device and without user intervention, at least a portion of the text based message based at least in part on one of the first response or the second response to generate a modified text based message;
generating, by the computing device, an updated knowledge base query based at least in part on the modified text based message;
sending, by the computing device, the updated knowledge base query via the knowledge base interface to the first knowledge base engine;
in response to sending the updated knowledge base query, receiving, by the computing device, a third response from the first knowledgebase engine;
fusing, by the computing device, the second response and the third response to result in a fused response, and outputting, by the computing device, the fused response at the output interface.

18. The method of claim 17, further comprising:
listening, by the computing device, for a trigger word or phrase; and
in response to detecting the trigger word or phrase, listening for and receiving, by the computing device, the spoken request from the user.

19. The method of claim 17, further comprising:
fusing, by the computing device, the second response and the third response by ranking the second response and the third response and selecting a best response from the second response and the third response.

20. The method of claim 17, further comprising:
fusing, by the computing device, the second response and the third response by combining information from each of the second response and the third response into a single response.

21. The method of claim 17, further comprising:
fusing, by the computing device, the second response and the third response by sequentially outputting each of the second response and the third response via the output interface.

22. The method of claim 17, further comprising:
selecting, by the computing device, fewer than all of two or more different knowledge base engines based at least in part on the text based message;
sending, by the computing device, the one or more knowledge base queries to each of the selected knowledge base engines via the knowledge base interface; and
receiving, by the computing device, a corresponding response from each of the selected knowledge base engines.

* * * * *